(12) United States Patent
Yoshida et al.

(10) Patent No.: US 7,503,547 B2
(45) Date of Patent: Mar. 17, 2009

(54) BICYCLE ELECTRIC CABLE TENSIONING ASSEMBLY

(75) Inventors: Fumiaki Yoshida, Sakai (JP); Kazuhiro Fujii, Sakai (JP)

(73) Assignee: Shimano Inc., Osaka (JP)

( * ) Notice: Subject to any disclaimer, the term of this patent is extended or adjusted under 35 U.S.C. 154(b) by 234 days.

(21) Appl. No.: 11/542,646

(22) Filed: Oct. 4, 2006

(65) Prior Publication Data
US 2008/0084046 A1    Apr. 10, 2008

(51) Int. Cl.
*B21F 9/00* (2006.01)
(52) U.S. Cl. ........................ 254/245; 254/246
(58) Field of Classification Search ................ 254/245, 254/246, 250, 256
See application file for complete search history.

(56) References Cited

U.S. PATENT DOCUMENTS

| | | | | |
|---|---|---|---|---|
| 2,996,283 A | * | 8/1961 | Johnson | ...................... 254/256 |
| 6,364,044 B1 | * | 4/2002 | Juan | ........................... 180/206 |
| 6,494,436 B1 | * | 12/2002 | Hopps | ........................ 254/245 |
| 6,644,443 B1 | * | 11/2003 | Jager | ........................... 188/2 F |
| 6,725,978 B2 | * | 4/2004 | Karpowich | ................... 188/20 |
| 6,899,649 B2 | * | 5/2005 | Ichida et al. | .................. 474/70 |
| 2006/0189423 A1 | | 8/2006 | Ichida et al. | |

FOREIGN PATENT DOCUMENTS

| | | |
|---|---|---|
| JP | S56-93138 | 7/1981 |
| JP | H02-141745 | 11/1990 |
| JP | H03-40200 | 8/1991 |
| JP | H05-42795 | 6/1993 |
| JP | H05-164195 | 6/1993 |
| JP | H06-4116 | 2/1994 |
| JP | 3009257 | 1/1995 |
| JP | H08-166046 | 6/1996 |
| JP | H09-184510 | 7/1997 |

* cited by examiner

*Primary Examiner*—Emmanuel M Marcelo
(74) *Attorney, Agent, or Firm*—Global IP Counselors, LLP

(57) ABSTRACT

A bicycle electrical cable tensioning assembly includes a tensioning body. The tensioning body includes a frame attachment portion and a cable tensioning portion. The frame attachment portion is configured and arranged for connection to a bicycle frame. The cable tensioning portion is configured to provide and adjust tension to an electrical cable.

18 Claims, 7 Drawing Sheets

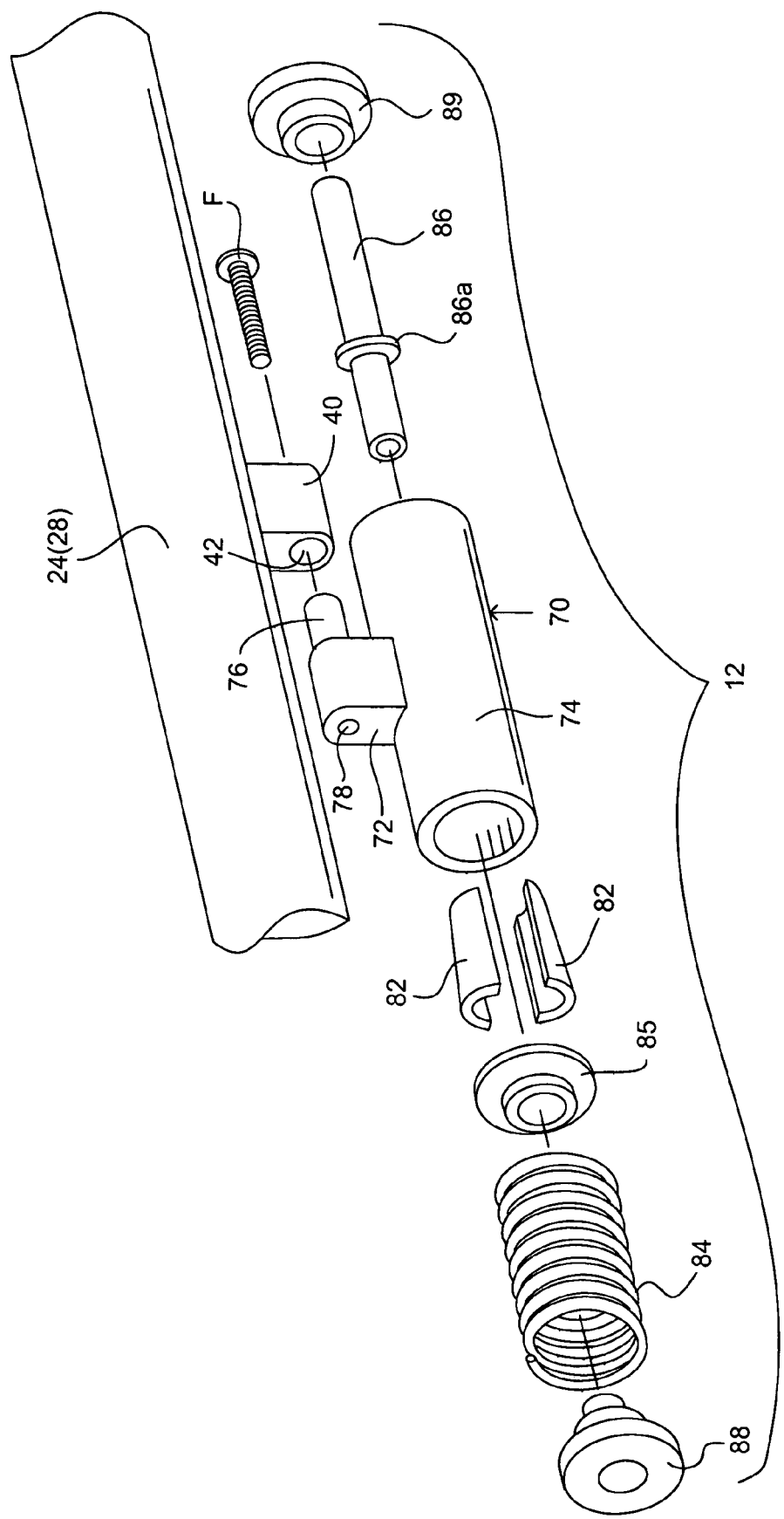

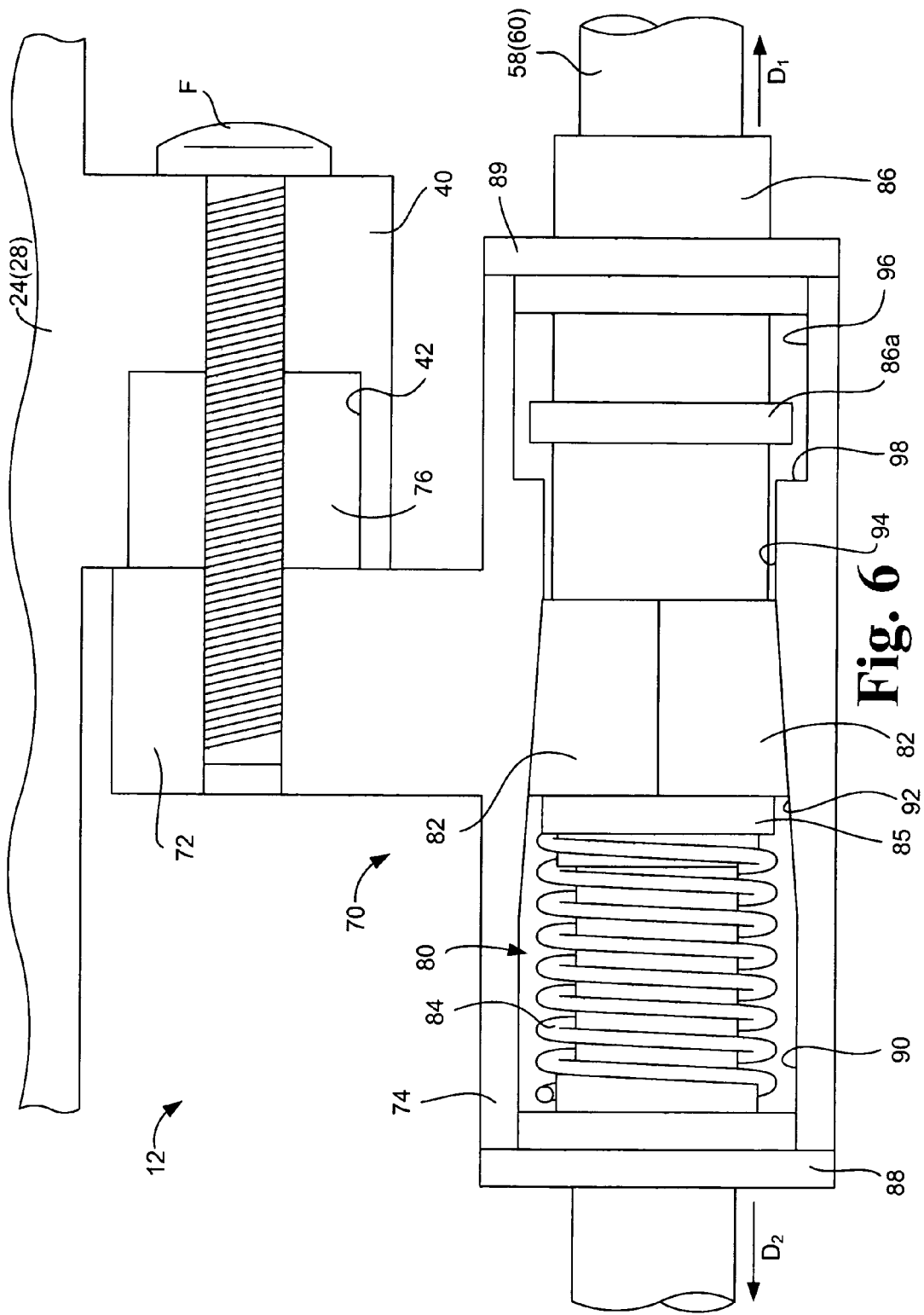

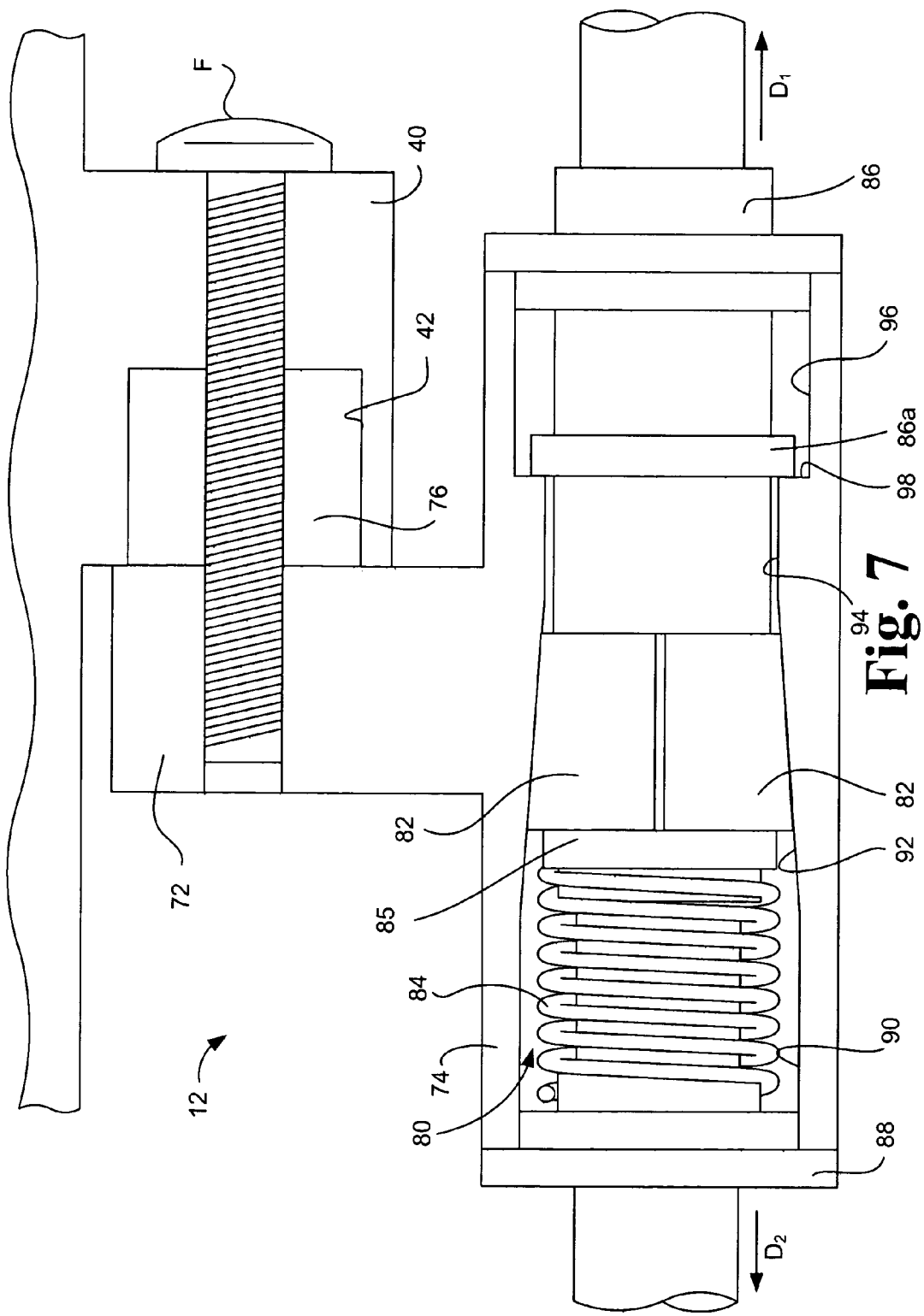

BICYCLE ELECTRIC CABLE TENSIONING ASSEMBLY

BACKGROUND OF THE INVENTION

1. Field of the Invention

This invention generally relates to a bicycle electric cable tensioning assembly. More specifically, the present invention relates to a bicycle electric cable tensioning assembly that attaches to a bicycle frame.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is the bicycle shifter mechanism, front derailleur and rear derailleur.

In particular, the front and rear derailleurs are now provided with electrically powered shift assist motors. For example, the shifter mechanism is provided with an electronic controller, switches and/or levers. A cyclist presses or touches one of the switches and/or levers and the controller transmits a control signal to the appropriate motor (a rear derailleur motor or a front derailleur motor). With no further effort from the cyclist, the desired gear ratio is established by powered movement of the bicycle chain to the appropriate front and/or rear chain sprocket.

In such a system, the shifter mechanism, the front derailleur and the rear derailleur must be electronically connected to one another. Consequently, one or more electrical cables are provided. For example, one or more electrical cables extends between the shifter mechanism, the front derailleur and the rear derailleur.

Since bicycles typically travel at high rates of speed, it is important to retain the electrical cables in a stationary orientation on the bicycle frame.

In view of the above, it will be apparent to those skilled in the art from this disclosure that there exists a need for an improved electrical cable retaining configuration that maintains the electrical cables in a stationary orientation on the bicycle frame. This invention addresses this need in the art as well as other needs, which will become apparent to those skilled in the art from this disclosure.

SUMMARY OF THE INVENTION

One object of the present invention is to maintain an electrical cable in a stationary orientation with respect to a bicycle frame.

Another object of the present invention is to provide a simple mechanism for tensioning an electric cable without modification to the bicycle frame.

The foregoing objects can basically be attained by providing a bicycle electrical cable tensioning assembly includes a tensioning body. The tensioning body includes a frame attachment portion and a cable tensioning portion. The frame attachment portion is configured and arranged for connection to a bicycle frame. The cable tensioning portion is configured to provide and adjust tension to an electrical cable.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 5 is an exploded perspective view of the electrical cable tensioning assembly showing aspects of the electrical cable tensioning assembly in accordance with one embodiment of the present invention;

FIG. 6 is a side schematic view of the electrical cable tensioning assembly showing the electrical cable tensioning assembly restricting movement of an electric cable in a first direction of movement in accordance with one embodiment of the present invention; and FIG. 7 is a side schematic view of the electrical cable tensioning assembly showing a release mechanism of the electrical cable tensioning assembly moved to allow movement of the electric cable in the first direction of movement in accordance with one embodiment of the present invention.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
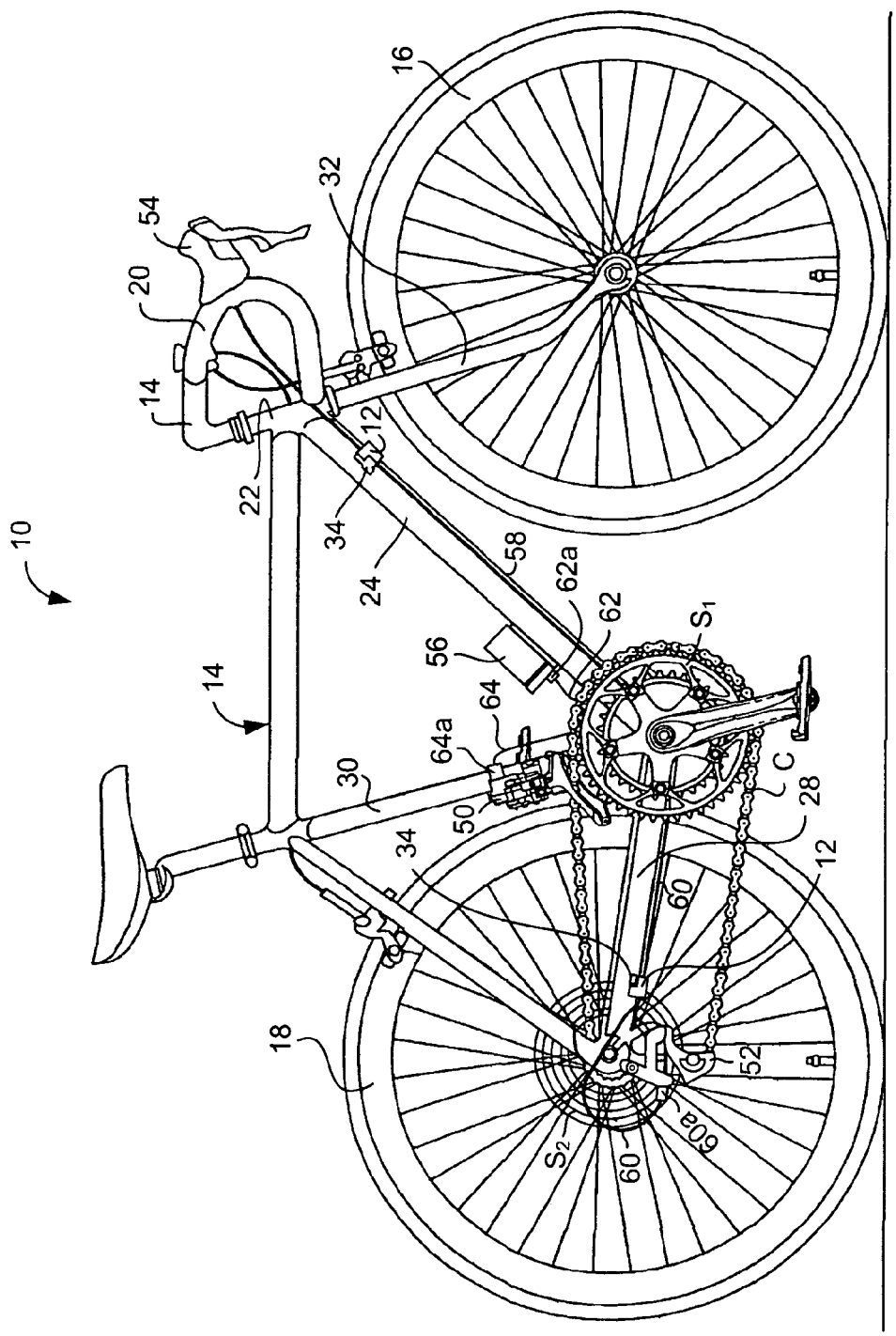
FIG. 1 is a side elevational view of a bicycle having a bicycle frame and a power assisted gear shifting system that includes an electrical cable tensioning assembly in accordance with one embodiment of the present invention.

Referring initially to FIG. 1, a bicycle 10 having an electrical cable tensioning assembly 12 is illustrated in accordance with a first embodiment of the present invention.

The bicycle 10 basically includes (among other things) a frame 14, a front wheel 16, a rear wheel 18, a handlebar 20 and a power assisted gear shifting system that includes the electrical cable tensioning assembly 12, as described in greater detail below.

Figure 2:
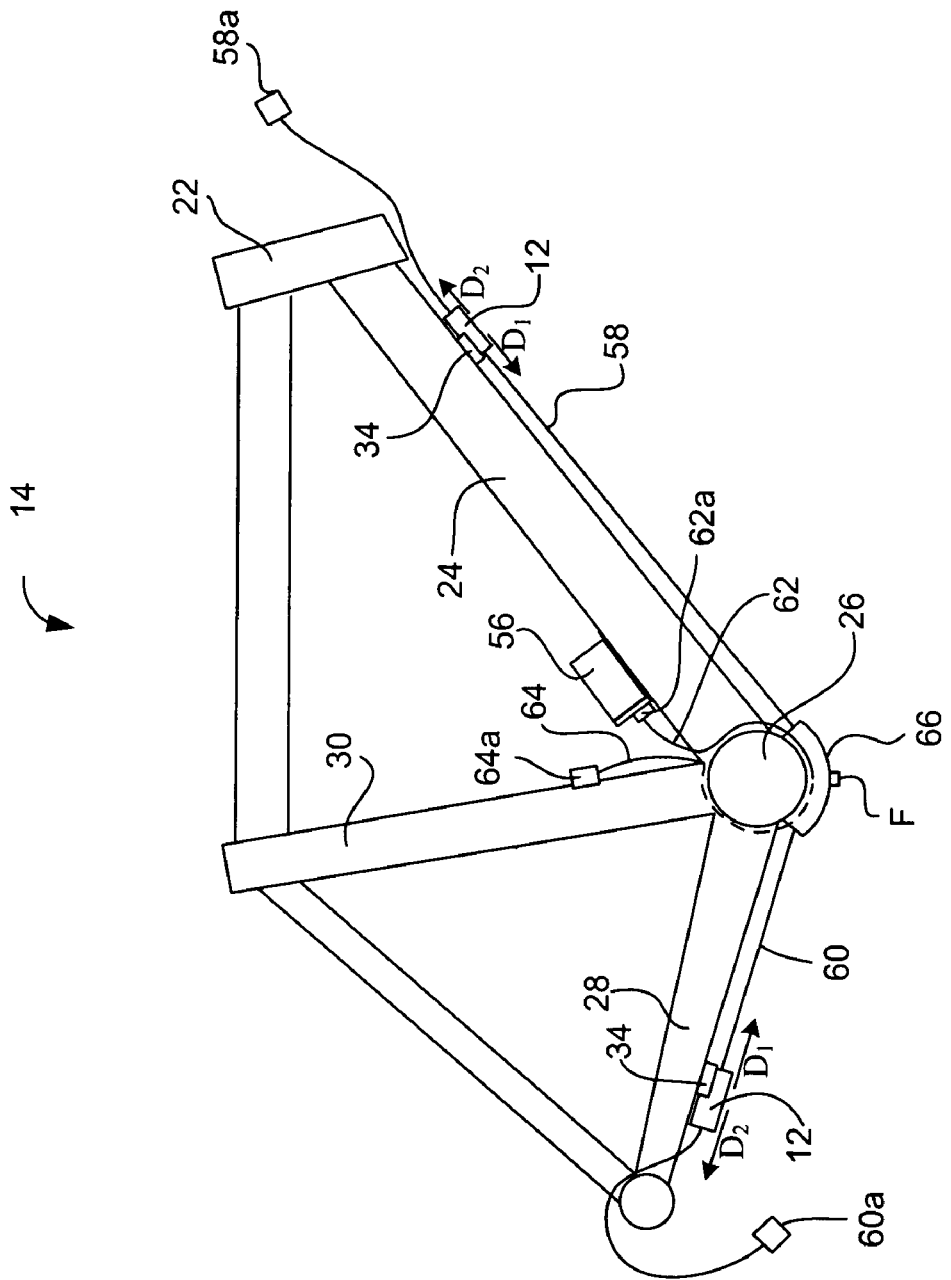
FIG. 2 is a side schematic view of the bicycle frame depicted in FIG. 1, with various components of the bicycle removed to show various electric cables of the power assisted gear shifting system and the electrical cable tensioning assembly in accordance with one embodiment of the present invention.

As shown schematically in FIG. 2, the frame 14 basically includes (among other things) a head tube 22, a down tube 24, a bottom bracket mounting portion 26, chain stays 28 and a seat tube 30 that are all interconnected to form a rigid structure that defines the frame 14. The frame 14 can be made of metallic elements welded together or formed with any of a variety a composite materials such a fiberglass and/or carbon fiber materials.

As shown in FIG. 1, the front wheel 16 is supported by a front fork 32 that extends through the head tube 22. The rear wheel 18 is supported between the chain stays 28 in a conventional manner (only one chain stay 28 is visible in FIGS. 1 and 2).

The frame 14 also includes at least two mechanical cable receiving portions 34. One of the mechanical cable receiving portions 34 is disposed proximate an upper end on a lower surface of the down tube 24. The other of the mechanical cable receiving portions 34 is disposed proximate a rear portion of a lower surface of one of the chain stays 28, as shown in FIG. 2. However, it should be understood from the description herein and the accompanying drawings that the mechanical cable receiving portions 34 can be located in any of a variety of locations on the frame 14.

The mechanical cable receiving portions 34 are generally the same and therefore description of one applies to both. For the sake of brevity, only one of mechanical cable receiving portions 34 is described with the description applying to both.

Figure 4:
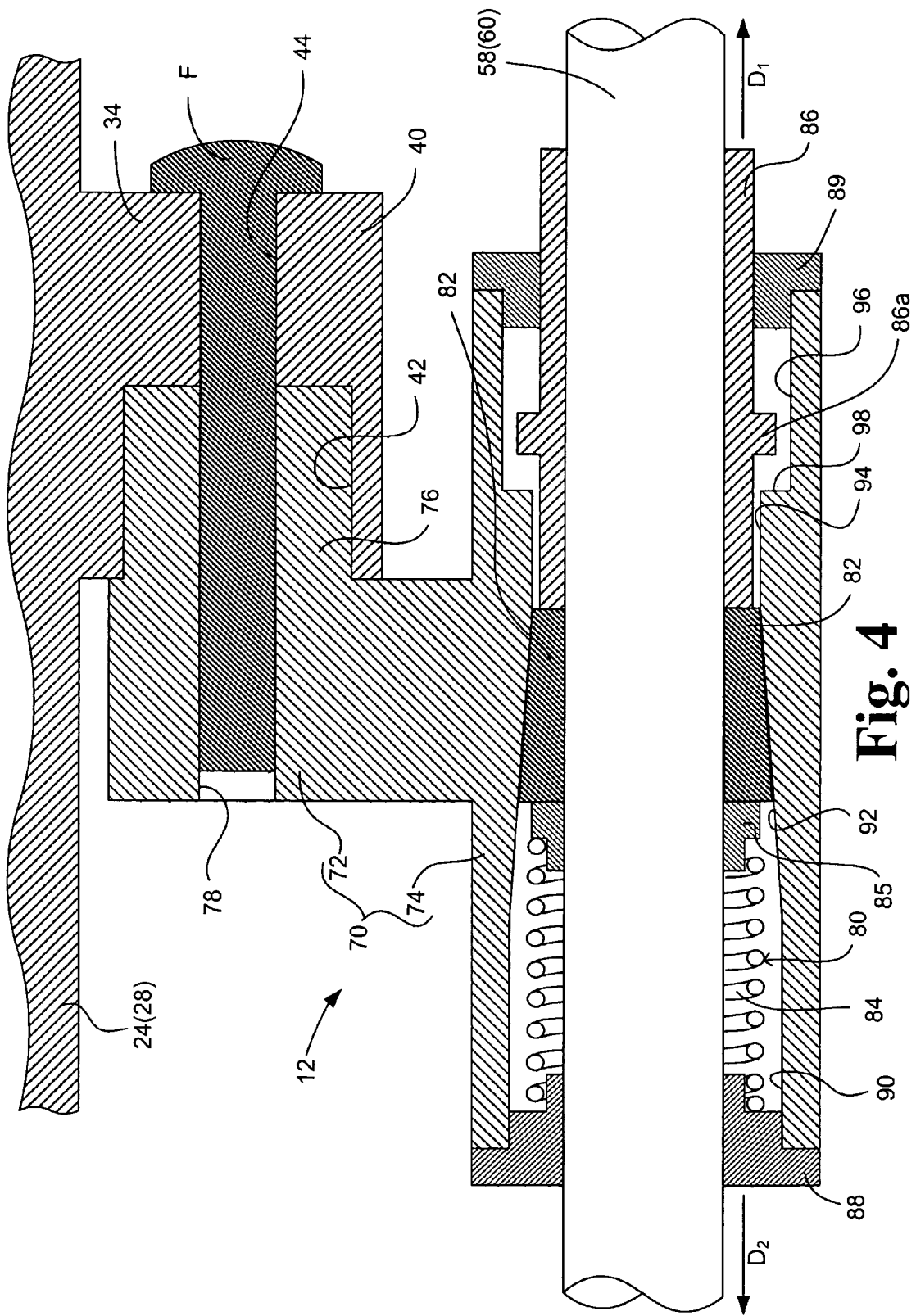
FIG. 4 is a cross-sectional view of one electrical cable tensioning assembly showing attachment to the bicycle frame and aspects of the electrical cable tensioning assembly in accordance with one embodiment of the present invention.

As shown in FIGS. 4 and 5, the mechanical cable receiving portion 34 is preferably similar to, or the same, as a Bowden type cable support. Specifically, the mechanical cable receiving portion 34 can be used to retain an outer casing of a Bowden type cable. A tensioned cable can extend through the mechanical cable receiving portion 34, if desired. Alternatively, the mechanical cable receiving portion 34 can be a structure specifically constructed to receive the electrical cable tensioning assembly 12. Either configuration support the electrical cable tensioning assembly 12, as described in greater detail below.

As shown in FIGS. 4 and 5, the mechanical cable receiving portion 34 is attached to or formed integrally with the frame 14 of the bicycle 10. The mechanical cable receiving portion 34 includes a projection 40 that is formed with a cylindrically shaped recess 42 and an aperture 44 that is coaxially aligned with the recess 42. The aperture 44 extends from an innermost end of the recess 42 to an outer surface of the projection 40.

As indicated in FIG. 1, the power assisted gear shifting system includes a front derailleur 50, a rear derailleur 52, a shifter mechanism 54, a battery 56, electric cables 58, 60, 62 and 64, a junction 66 (FIG. 2) and at least two of the electrical cable tensioning assemblies 12.

The front derailleur 50 is supported on the seat tube 30 of the frame 14 above the bottom bracket mounting portion 26. The rear derailleur 52 is attached to a rear frame end. The shifter mechanism 54 is supported on the handle bar 20 and the battery 56 is supported on the down tube 24. The junction 66 is attached to the bottom bracket mounting portion 26, as shown in FIG. 2. The electric cable 58 extends between the junction 66 and the shifter mechanism 54. The electric cable 60 extends between the junction 66 and the rear derailleur 52. The electric cable 62 extends between the junction 66 and the battery 56. The electric cable 64 extends between the junction 66 and the front derailleur 50.

The front and rear derailleurs 50 and 52 are power assisted. Specifically, positioning of chain guides of each of the front and rear derailleurs 50 and 52 are controlled by, for instance, electric motors. Each of the front and rear derailleurs 50 and 52 include position control sensors which provide chain guide position signals to a controller (not shown) located in, for example, the shifter mechanism 54. However, it should be understood that the controller can be located in any of a variety of locations on the bicycle 10, such as adjacent to the battery 56, within the junction 66 or in either one of the front and rear derailleurs 50 and 52.

The shifter mechanism 54 includes levers or buttons (not shown) operated by a cyclist for changing the gear ratio of the chain C. Specifically, operating one of the buttons or levers on the shifter mechanism 54 causes the controller to send a signal to the motor in the front derailleur 50 and/or the motor in the rear derailleur 52. The signal causes the corresponding motor to move the corresponding chain guide and hence the chain C to a different chain sprocket of one of either the front chain rings $S_1$ and the rear chain rings $S_2$.

The various signals between the shifter mechanism 54 and the chain guide positioning sensors in the front and rear derailleurs 50 and 52, and electric power from the battery 56 are transmitted through the electric cables 58, 60, 62 and 64 and the junction 66.

Figure 3:
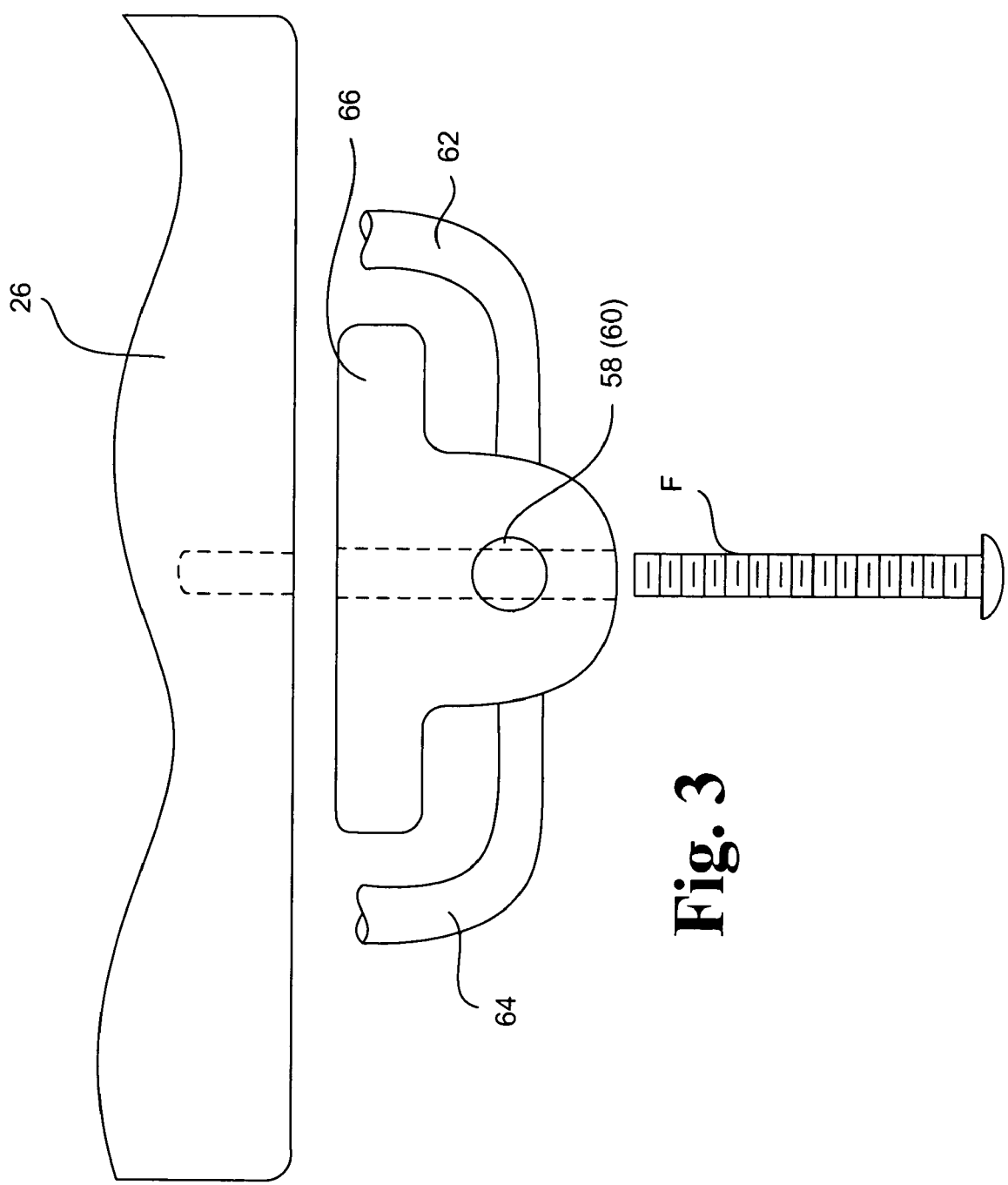
FIG. 3 is a rear elevational view of an electric cable junction that attaches to a lower portion of the bicycle frame in accordance with one embodiment of the present invention.

As shown in FIG. 3, the junction 66 is basically a solid support member fixed to the bottom bracket mounting portion 26 by a fastener F. The junction 66 includes circuitry and/or connections (not shown) between the various wires protected within the electric cables 58, 60, 62 and 64. As shown in FIGS. 2 and 3, the electric cable 58 extends out of a front portion of the junction 66. The electric cable 60 extends out of a rear portion of the junction 66. Further, the electric cables 62 and 64 extend out of opposite sides the junction 66.

The electric cables 58 and 60 are fixedly secured within the junction 66. Consequently, a predetermined amount of tension can be applied to each of the electric cables 58 and 60 without any movement of the electric cables 58 and 60 relative to the junction 66.

As shown in FIGS. 1 and 2, the electric cable 58 extends from the junction 66 along an underside of the down tube 24 through the electrical cable tensioning assembly 12 located adjacent to the head tube 22 and further extends to the shifter mechanism 54. The electric cable 58 connects to the shifter mechanism 54 via a connector 58a. The electric cable 60 extends from the junction 66 along an underside of one of the chain stays 28 through the electrical cable tensioning assembly 12 located adjacent to the rear derailleur 52 and further extends to the rear derailleur 52. The electric cable 60 connects to the rear derailleur 52 via a connector 60a. The electric cable 62 extends from the junction 66 to the battery 56 and connects to the battery 56 via a connector 62a. The electric cable 64 extends from the junction 66 to the front derailleur 50 and connects to the front derailleur 50 via a connector 62a.

With specific reference to FIGS. 4, 5, 6 and 7, a description of the electrical cable tensioning assembly 12 is now provided. The electrical cable tensioning assembly 12 basically includes a tensioning body 70 that has a frame attachment portion 72 and a cable tensioning portion 74. The frame attachment portion 72 and the cable tensioning portion 74 extend in directions generally parallel to one another. The frame attachment portion 72 is configured and arranged for connection to the frame 14. Specifically, the frame attachment portion 72 is configured and arranged for connection to the mechanical cable receiving portion 34.

The frame attachment portion 72 basically includes a protrusion 76 and a threaded aperture 78 (a fastener receiving portion). The protrusion 76 configured and dimensioned to insert into the recess 42 of the mechanical cable receiving portion 34. The threaded aperture 78 is configured to receive a fastener F that extends through the aperture 44 in the mechanical cable receiving portion 34.

The cable tensioning portion 74 has a hollow interior 80 configured to receive the electrical cable 58 (or 60) extending therethrough. For the sake of brevity, electric cable 58 is referred to in the following description. However, since the electrical cable tensioning assembly 12 is used for both of the electric cables 58 and 60, the following description applies to use with either of the electric cables 58 and 60.

The cable tensioning portion 74 is configured to provide and adjust tension to the electrical cable 58. Within the hollow interior 80, the cable tensioning portion 74 further includes two wedge members 82, a biasing spring 84, a spring cap 85, a release member 86 and end caps 88 and 89.

The hollow interior 80 has four separate inner surface portions, a first inner portion 90, a tapered portion 92, a second inner portion 94 and the third inner portion 96. The first, second and third inner portions 90, 94 and 96 preferably each have their own uniform diameter surface. However, the first inner portion 90 has a diameter larger than the second inner portion 94. The third inner portion 96 has a diameter larger than the second inner portion 94. Consequently, an annular surface 98 extends between the second inner portion 94 and the third inner portion 96. The tapered portion 92 has a gradually diminishing diameter extending between the first and second inner portion 90 and 94.

The two wedge members 82 each have a tapered outer surface corresponding approximately to the tapering of the tapered portion 92 of the hollow interior 80 of the cable tensioning portion 74. Further, the two wedge members 82 have generally uniform diameter inner surfaces that are slightly smaller than an outer surface of the cables 58 and 60.

The biasing spring 84 is a compressible coil spring having a predetermined spring constant sufficient to apply a biasing force on the two wedge members 82. The spring cap 85 has a recess that receives one end of the biasing spring 84. An opposite end of the spring cap 85 is configured for contact with the two wedge members 82 in order to transfer biasing force from the biasing spring 84.

As shown in FIG. 4, the release member 86 is a generally hollow cylindrically shaped sleeve member disposed coaxially about the electric cable 58 that includes an annular ring portion 86a that projects outwardly from the release member 86.

The main portion of the release member 86 has an outer diameter that is slightly smaller than the second inner portion 94 of the hollow interior 80 of the cable tensioning portion 74. However, the annular ring portion 86a has an outer diameter that is slightly smaller than the diameter of the third inner portion 96 of the hollow interior 80 of the cable tensioning portion 74, but larger than the diameter of the second inner portion 94. Consequently, the release member 86 is movable within the hollow interior 80, but that movement is restricted by contact between the annular ring portion 86a and the annular surface 98.

The end cap 88 includes two recesses, each having progressively smaller diameters. The smallest recess receives and restricts movement of the biasing spring 84. The next recess is dimensioned to engage and provide a force fit with the surface of the first inner portion 90 of the hollow interior of the cable tensioning portion 74. The end cap 88 further includes a central aperture that allows either of the electric cables 58 and/or 60 to move freely there through.

The end cap 89 includes a single recess that is dimensioned to engage and provide a force fit with the surface of the third inner portion 96 of the hollow interior of the cable tensioning portion 74. The end cap 89 further includes a central aperture that allows either of the electric cables 58 and/or 60 to move freely there through.

As shown in FIGS. 4 and 5, the two wedge members 82 are disposed within the hollow interior 80 approximately located at the tapered portion 92. The biasing spring 84 is disposed in the first inner portion 90 of the hollow interior 80 and applies a biasing force to the wedge members 82 causing the wedge members 82 to contact the surface of the tapered portion 92. Consequently, the wedge members 82 are urged into contact with the electric cable 58. The force of the biasing spring 84 on the wedge members 82 and consequently on the electric cable 58 is such that movement in the first direction $D_1$ is restricted, as indicated in FIGS. 4 and 6.

The wedge members 82 are configured to engage and restrict movement of the electric cable 58 in at least the first direction $D_1$ of the electrical cable 58. Specifically, if external tension is applied to the electric cable 58 for movement in the first direction $D_1$, the electric cable 58 cannot move in the first direction $D_1$. However, if tension or force is applied to the electric cable 58 in a second direction $D_2$, the electric cable 58 can move in the second direction $D_2$. Specifically, movement of the electric cable 58 in the second direction $D_2$ causes the wedge members 82 to press against the biasing spring 84. The biasing spring 84 compresses and the wedge members 82 can move away from one another. Thus the electric cable is able to move in the second direction $D_2$.

Further, as shown in FIG. 7, if the release member 86 is moved in the second direction $D_2$, the release member 86 presses against the wedge members 82. The biasing spring 84 is compressed and the force of the biasing spring 84 on the wedge members 82 is released and the forces on the electric cable 58 are released. Consequently, with the release member 86 in the position shown in FIG. 7, the electric cable 58 can move freely in the first direction $D_1$. Hence, the release member 86 is a release mechanism that moves the wedge members 82 against the force of the biasing spring 84. Hence, the wedge members 82 no longer engage the electric cable 58. Consequently, the electric cable 58 is movable in the first direction $D_1$ and second direction $D_2$. Further, the release member 86 (the release mechanism) is at least partially disposed within the hollow interior 80.

It should be understood from the drawings and the description herein that the first and second directions $D_1$ and $D_2$ are defined relative to the electrical cable tensioning assembly 12. Specifically, as shown in FIG. 2 the front one of the electrical cable tensioning assembly 12 (mounted to the down tube 24) has first and second directions $D_1$ and $D_2$ defined with respect thereto. Similarly, the rearward one of the electrical cable tensioning assembly 12 (mounted to one of the chain stays 28) has first and second directions $D_1$ and $D_2$ defined with respect there.

With reference to FIGS. 2 and 7, the electrical cable tensioning assembly 12 basically operates as follows. If the electric cable 58 is loose and needs to be tensioned, the following steps are followed. First, the portion of the electric cable 58 adjacent to the connector 58a is pulled forward away from the electrical cable tensioning assembly 12 and toward the handlebar 20. Pulling the electric cable 58 adjacent to the connector 58a causes the electric cable 58 to move the wedge members 82 in the second direction $D_2$. The wedge members 82 compress the biasing spring 84 allowing the electric cable 58 to move. Since the junction 66 is fixed to the bottom bracket mounting portion 26, and the junction 66 firmly holds the electric cable 58, the electric cable 58 can be pulled into tension between the junction 66 and the electrical cable tensioning assembly 12. Once the electric cable 58 is released, biasing spring 84 and the wedge members 82 again apply force to the electric cable 58 maintaining the tension between the junction 66 and the electrical cable tensioning assembly 12.

The electric cable 60 is tensioned in a similar manner. Specifically, the electric cable 60 adjacent to the connector 60a is pulled rearward away from the electrical cable tensioning assembly 12 at the rear of the frame 14. Pulling the electric cable 60 rearward causes the electric cable 60 to move the wedge members 82 in the second direction $D_2$ (the first and second directions $D_1$ and $D_2$ are defined relative to the electrical cable tensioning assembly 12). The wedge members 82 compress the biasing spring 84 allowing the electric cable 60 to move and become tensioned. Since the junction 66 is fixed to the bottom bracket mounting portion 26 and the junction 66 firmly holds the electric cable 60. Hence, the electric cable 60 can be pulled into tension between the junction 66 and the electrical cable tensioning assembly 12. Once the electric cable 60 is released, the biasing spring 84 and the wedge members 82 again apply force to the electric cable 60 maintaining the tension between the junction 66 and the electrical cable tensioning assembly 12.

GENERAL INTERPRETATION OF TERMS

In understanding the scope of the present invention, the term "configured" as used herein to describe a component, section or part of a device that is constructed to carry out the desired function. In understanding the scope of the present invention, the term "comprising" and its derivatives, as used herein, are intended to be open ended terms that specify the presence of the stated features, elements, components and groups but do not exclude the presence of other unstated features, elements, components, groups and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle electrical cable tensioning assembly, comprising:
   a bicycle frame including a mechanical cable receiving portion with a cable receiving recess; and
   a tensioning body having a frame attachment portion removably attached to the mechanical cable receiving portion and a cable tensioning portion configured to provide and adjust tension to an electrical cable, the frame attachment portion having a protrusion extending into the recess for removable attachment thereto.

2. The bicycle electrical cable tensioning assembly as set forth in claim 1 wherein
   the protrusion includes a fastener receiving portion for receiving a fastener that extends through an aperture in the mechanical cable receiving portion.

3. The bicycle electrical cable tensioning assembly as set forth in claim 1 wherein
   the cable tensioning portion includes at least one wedge member configured to engage and restrict movement in at least a first direction of the electrical cable.

4. The bicycle electrical cable tensioning assembly as set forth in claim 3 wherein
   the cable tensioning portion includes a biasing spring configured to bias the at least one wedge member into engagement with the electric cable.

5. The bicycle electrical cable tensioning assembly as set forth in claim 4 wherein
   the cable tensioning portion includes a release mechanism configured to move the at least one wedge member against force from the biasing spring out of engagement with the electric cable such that the electric cable is movable in the first direction.

6. The bicycle electrical cable tensioning assembly as set forth in claim 3 wherein
   the cable tensioning portion includes a release mechanism configured to move the at least one wedge member out of engagement with the electric cable such that the electric cable is movable in the first direction.

7. The bicycle electrical cable tensioning assembly as set forth in claim 6 wherein
   the release mechanism includes a cylindrically shaped sleeve member disposed coaxially about the electric cable.

8. The bicycle electrical cable tensioning assembly as set forth in claim 1 wherein
   the frame attachment portion and the cable tensioning portion of the tensioning body extend in directions generally parallel to one another.

9. The bicycle electrical cable tensioning assembly as set forth in claim 1 wherein
   the cable tensioning portion of the tensioning body includes a hollow interior configured to receive the electrical cable extending therethrough.

10. The bicycle electrical cable tensioning assembly as set forth in claim 9 wherein
    the cable tensioning portion includes at least one wedge member disposed within the hollow interior that is configured to engage and restrict movement in at least a first direction of the electrical cable.

11. The bicycle electrical cable tensioning assembly as set forth in claim 10 wherein
    the cable tensioning portion includes a biasing spring configured to bias the at least one wedge member into engagement with the electric cable.

12. The bicycle electrical cable tensioning assembly as set forth in claim 11 wherein
    the cable tensioning portion includes a release mechanism at least partially disposed within the hollow interior that is configured to move the at least one wedge member against force from the biasing spring out of engagement with the electric cable such that the electric cable is movable in the first direction.

13. The bicycle electrical cable tensioning assembly as set forth in claim 12 wherein
    the hollow interior of the cable tensioning portion of the tensioning body includes a tapered portion with a conically shaped surface and the at least one wedge member has a corresponding tapered outer surface contacting the conically shaped surface.

14. The bicycle electrical cable tensioning assembly as set forth in claim 10 wherein
    the cable tensioning portion includes a release mechanism at least partially disposed within the hollow interior configured to move the at least one wedge member out of engagement with the electric cable such that the electric cable is movable in the first direction.

15. The bicycle electrical cable tensioning assembly as set forth in claim 14 wherein
the release mechanism includes a cylindrically shaped sleeve member disposed coaxially about the electric cable.

16. A bicycle electrical cable tensioning assembly, comprising:
a tensioning body having a frame attachment portion configured and arranged for connection to a bicycle frame and a cable tensioning portion configured to provide and adjust tension to an electrical cable,
the cable tensioning portion of the tensioning body including: a hollow interior, a pair of wedge members, a biasing spring, and a cylindrically shaped sleeve member,
the hollow interior dimensioned to receive the electrical cable extending therethrough,
the pair of wedge members disposed within the hollow interior to engage and restrict movement in at least a first direction of the electrical cable,
the biasing spring biasing the pair of wedge members into engagement with the electric cable,
the cylindrically shaped sleeve member disposed coaxially about a portion of the electric cable and at least partially disposed within the hollow interior such that movement of the cylindrically shaped sleeve member toward the pair of wedge members against force from the biasing spring moves the pair of wedge members out of engagement with the electric cable such that the electric cable is thereafter movable in the first direction.

17. The bicycle electrical cable tensioning assembly as set forth in claim 16, wherein
the bicycle frame includes a mechanical cable receiving portion with a cable receiving recess; and
the tensioning body is removably attached to the mechanical cable receiving portion, the frame attachment portion having a protrusion extending into the recess for removable attachment thereto.

18. The bicycle electrical cable tensioning assembly as set forth in claim 16 wherein
the hollow interior of the cable tensioning portion of the tensioning body includes a tapered portion with a conically shaped surface and the pair of wedge members have corresponding tapered outer surfaces contacting the conically shaped surface.

* * * * *